(12) United States Patent
Okada et al.

(10) Patent No.: US 11,739,909 B2
(45) Date of Patent: Aug. 29, 2023

(54) LIGHTING DEVICE

(71) Applicant: Japan Display Inc., Tokyo (JP)

(72) Inventors: Masafumi Okada, Tokyo (JP); Nobuyuki Suzuki, Tokyo (JP); Makoto Hasegawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/863,456

(22) Filed: Jul. 13, 2022

(65) Prior Publication Data

US 2023/0027661 A1   Jan. 26, 2023

(30) Foreign Application Priority Data

Jul. 21, 2021 (JP) .................................. 2021-120153

(51) Int. Cl.
*F21V 7/04* (2006.01)
*G03B 21/20* (2006.01)
*F21Y 115/10* (2016.01)

(52) U.S. Cl.
CPC .......... *F21V 7/041* (2013.01); *G03B 21/2066* (2013.01); *F21Y 2115/10* (2016.08)

(58) Field of Classification Search
CPC ............................. F21V 7/041; G03B 21/2066
See application file for complete search history.

(56) References Cited

U.S. PATENT DOCUMENTS

| | | | |
|---|---|---|---|
| 2016/0327243 A1* | 11/2016 | Appelhans | ................ F21V 7/09 |
| 2017/0023211 A1* | 1/2017 | Sepkhanov | ............. F21V 5/005 |
| 2018/0217448 A1* | 8/2018 | Mifune | ............ G02F 1/133603 |
| 2018/0217449 A1* | 8/2018 | Mifune | ............ G02F 1/133605 |
| 2019/0170327 A1* | 6/2019 | Eisenfeld | ........... G02B 27/0994 |
| 2020/0386384 A1* | 12/2020 | Toko | .................... G02F 1/13471 |
| 2020/0386385 A1* | 12/2020 | Huang | .................... F21V 7/045 |
| 2022/0057070 A1* | 2/2022 | He | ........................ F21V 7/0066 |
| 2022/0257813 A1* | 8/2022 | Ramanand | ................ A61L 2/10 |

FOREIGN PATENT DOCUMENTS

| | | |
|---|---|---|
| JP | 2006-236814 A | 9/2006 |
| JP | 2008-159562 A | 7/2008 |

* cited by examiner

*Primary Examiner* — Christopher E Dunay
(74) *Attorney, Agent, or Firm* — Michael Best & Friedrich LLP

(57) ABSTRACT

The purpose is to realize a lighting device which can project a light spot of rectangle with a simple structure. The invention is: A lighting device having a light source unit 1, the light source unit 1 including a funnel shaped reflector 10 and an LED 20, in which the funnel shaped reflector 10 includes a neck and an opening, the LED 20 is disposed at the neck of the funnel shaped reflector 10, a plan view of the opening is a rectangle, and provided a distance from the neck to the opening along axis is d, and one side of the rectangle is x, either one of the first light source unit and the second light source unit satisfies, d/x is 2 or larger.

6 Claims, 16 Drawing Sheets

LIGHTING DEVICE

CLAIM OF PRIORITY

The present application claims priority from Japanese Patent Application JP 2021-120153 filed on Jul. 21, 2021, the content of which is hereby incorporated by reference into this application.

BACKGROUND OF THE INVENTION

(1) Field of the Invention

The present invention relates to a lighting device, especially to the one which is able to form any shapes of light spot.

(2) Description of the Related Art

A general lighting device has a circular light spot, therefore, it is difficult to illuminate every corner of a rectangular room floor or a rectangular surface of table uniformly without illumination unevenness.

Patent document 1 discloses a structure to acquire a pseud rectangular light spot. The shape of the lighting device is a cap shaped and a plan view of emitting surface is circular. The reflecting plates which are set in an inner wall of the cap shaped lighting device are changed for each inner places of the lighting device Patent document 2 discloses a structure to acquire a pseud rectangular light spot from a lighting device, which is cylinder in outer shape and has a circular shape at light emitting plane in a plan view. Many concave mirrors including lighting sources in them are disposed in the cylinder, and each of the shapes of concave mirrors are changed to acquire a pseud rectangular light spot.

PRIOR TECHNICAL DOCUMENT

Patent Document

Patent document 1: Japanese patent application laid open No. 2006-236814
Patent document 2: Japanese patent application laid open No. 2008-159562

SUMMARY OF THE INVENTION

As a means to acquire rectangular light spot, the structure of patent document 1 is, "the shape of the lighting device is a cap shaped and a plan view of emitting surface is circular; the reflecting plates which are set in an inner wall of the cap shaped lighting device are changed for each inner places of the lighting device," however, this structure needs a complicated design and manufacturing process because a plurality of different light reflecting plates must be disposed according to their reflecting characteristics in the lighting device.

On the other hand, the structure of patent document 2 is, "a lighting device, which is cylinder in outer shape and has a circular shape at light emitting plane in a plan view; many concave mirrors including lighting sources in them are disposed in the cylinder, and each of the shapes of concave mirrors are changed to acquire a pseud rectangular light spot," however, this structure also needs a complicated design and manufacturing process because a plurality of concave mirrors must be located considering their reflecting characteristic in the lighting device.

The purpose of the present invention is to realize a lighting device which can generate a rectangular light spot, and further, any shapes of light spot by simple structure.

The present invention solves the above explained problems; examples of concrete structures of the present invention are as follows.

(1) A lighting device having a light source unit, the light source unit including a funnel shaped reflector and an LED, in which the funnel shaped reflector includes a neck and an opening, the LED is disposed at the neck of the funnel shaped reflector, a plan view of the opening is a rectangle, and provided a distance from the neck to the opening along an optical axis is d, and one side of the rectangle is x, d/x is 2 or larger.

(2) A lighting device including a first light source and a second light source, the first light source and the second light source being juxtaposed with a certain distance, in which the first light source includes a first light source unit, and the second light source includes a second light source unit each of the first light source unit and the second light source unit includes a funnel shaped reflector having an opening and a neck, and an LED, which is disposed at the neck, a plan view of the opening is a rectangle, and provided a distance from the neck to the opening along an optical axis is d, and one side of the rectangle is x, d/x is 2 or larger.

(3) A lighting device including a structure having a plurality of light source units adjacently disposed, in which the plurality of light source units include a first light source unit and a second light source unit, each of the first light source unit and the second light source unit includes a funnel shaped reflector having an opening and a neck, and an LED, which is disposed at the neck, a plan view of the opening is a rectangle, and provided a distance from the neck to the opening along an optical axis is d, and one side of the rectangle is x, either one of the first light source unit and the second light source unit satisfies, d/x is 2 or larger.

BRIEF DESCRIPTION OF THE DRAWINGS

FIG. 22 is an example of light spot when all the light source units A, B, C and D are lighted on;

FIG. 23 is an example of light spot when the light source units A and D are lighted on;

FIG. 24 is an example of light spot when the light source units B and C are lighted on;

FIG. 28 is an example of light spot when three of light source units F are lighted on.

DETAILED DESCRIPTION OF THE PREFERRED EMBODIMENTS

Figure 2:
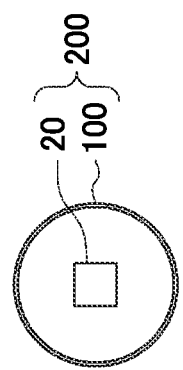
FIG. 2 is a bottom view of the lighting device of FIG. 1.
Figure 1:
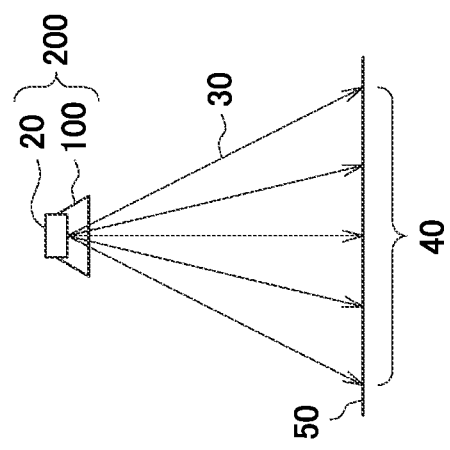
FIG. 1 is a cross sectional view of lighting condition in which a normal lighting device projects a light spot on the floor.

FIG. 1 is a cross sectional view of a light source unit 200 as a conventional example, having an LED light source 20, a reflecting plate 100 of a cap shaped in outer shape; light flux 30 from the lighting source unit 200, and a light spot 40 on the floor 50. FIG. 2 is a bottom view of the light source unit 200 of FIG. 1. As shown in FIG. 2, a plan view of the emitting surface of the light source unit 200 is circle.

Figure 3:
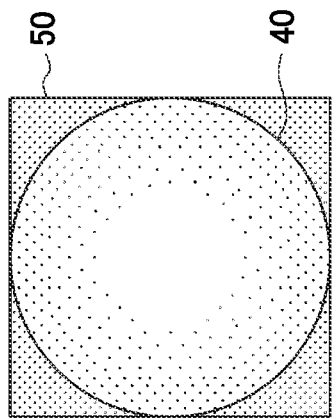
FIG. 3 is a plan view of a light spot on the floor.

In FIG. 1, the light flux 30 from the light source unit 200 makes a light spot 40 at e.g. the floor 50. FIG. 3 is a shape of the light spot 40. As shown in FIG. 3, the shape of the light spot 40 is circular. For example, when the room is rectangle, the circular light spot 40 does not illuminate the corners of the room, therefore, corners of the room is dark.

Figure 4:
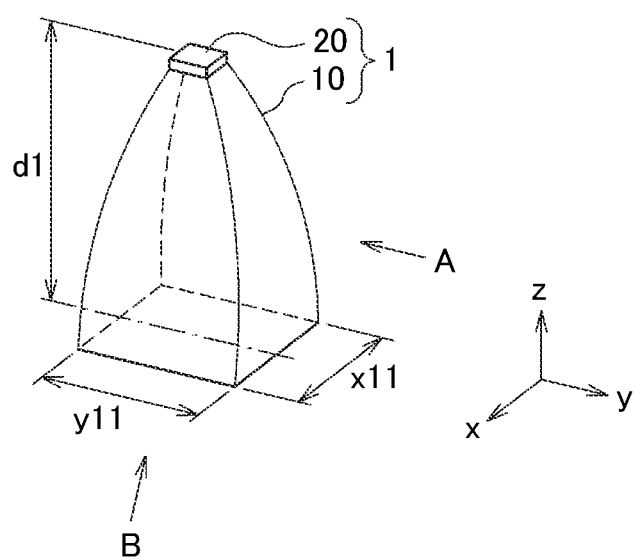
FIG. 4 is a cross sectional view of lighting condition in which a lens is disposed on the lighting device.

In the meantime, when a shape of the light spot 40 is desired to be changed, as to make the size of the light spot 40 smaller, a lens 70 is used as shown in FIG. 4. In FIG. 4, a convex lens 70 is disposed at the emitting surface of the light source unit 200 to make the light spot 40 smaller. If a concave lens is used, a diameter of the light spot 40 can be made larger; the shape of the light spot 40, however, is remained as circular. If a shape of the light spot 40 is desired to be changed by the lens, an aspheric lens is used; however, a complicated calculation and complicated manufacturing process are necessary for the aspheric lens.

The purpose of the present invention is to realize a lighting device which can generate a rectangular light spot, and further, any shapes of light spot by simple structure. The present invention is explained in detail by following embodiments.

Embodiment 1

Figure 5:
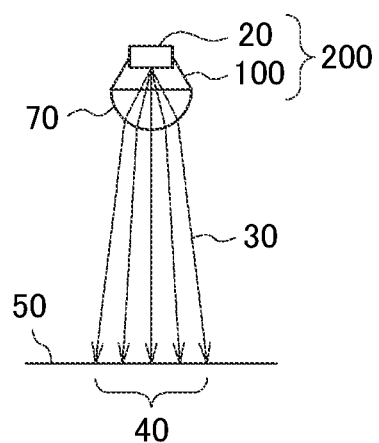
FIG. 5 is a perspective view of the light source unit according to the present invention.

FIG. 5 is a perspective view of a light source unit 1 according to the present invention. The feature of the light source unit 1 of FIG. 5 is that a funnel shaped reflector 10, which has a rectangular shape in a plan view, and has a Light Emitting Diode (herein after LED) 20 as a light source at the neck. The inside of the funnel shaped reflector 10 is mirror surface, and at least a part of the inner surface is parabolic to direct the light from the LED 20 to align with an optical axis. In FIG. 5, the optical axis is parallel to the z axis.

The emitting plane of the funnel shaped reflector 10 is rectangle; x11 and y11 are e.g. 6.9 mm. A height d1 of the funnel shaped reflector 10 is e.g. 20 mm. A LED 20 is disposed at the neck portion of the funnel like reflector 10; a size of the LED 20 is e.g. a cubic, one side of which is approximately 2 mm. As described above, the size of the light source unit 1 of FIG. 5 is very small.

When the funnel shaped reflector 10 is formed from metal, an enough mechanical strength can be maintained by a thickness of 0.2 mm. If the funnel shaped reflector 10 is formed from metal, e.g. a press molding can be used. The funnel shaped reflector 10 can be also formed from resin. In this case, the funnel shape is formed by resin mold; and metal of high reflectivity as e.g. aluminum is coated on the inner wall of the funnel by vacuum evaporation or sputtering to form a mirror surface.

Figure 6:
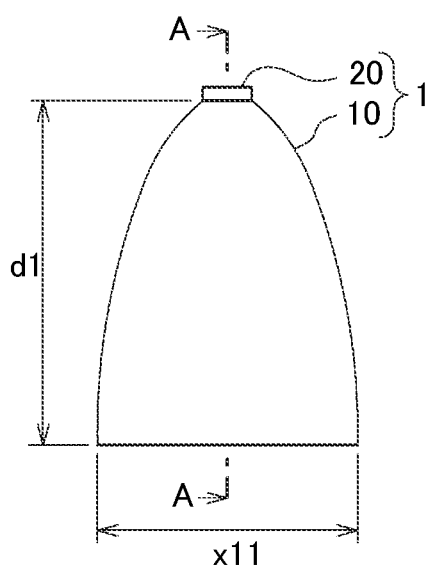
FIG. 6 is a side view of the light source unit according to the present invention.
Figure 7:
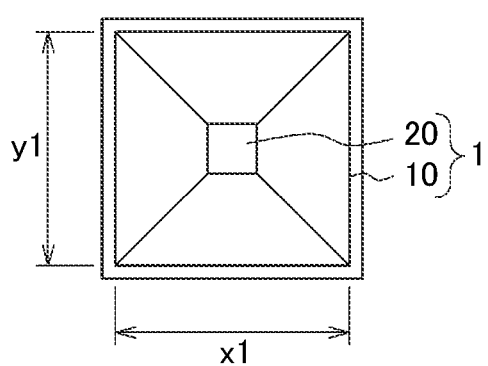
FIG. 7 is a bottom view of the light source unit according to the present invention.

FIG. 6 is a side view of the light source unit 1 viewed from the arrow A in FIG. 5. A height d1 of the funnel shaped reflector 10 is e.g. 20 mm; width x11 is e.g. 6.9 mm. Herein after, when a dimension of the funnel shaped reflector 10 is referred, it means an inner dimension if not specifically noticed. FIG. 7 is a bottom view of the light source unit 1 viewed from the arrow B in FIG. 5. As shown in FIG. 7, the opening of the light source unit 1 is rectangle; and the funnel shaped reflector 10 is designed so that the light spot maintains rectangle. In FIG. 7, the opening of the funnel shaped reflector 10 is square and each of inner diameters x1 and y1 is 6.5 mm. A thickness of the funnel shaped reflector 10 is 0.2 mm.

Figure 8:
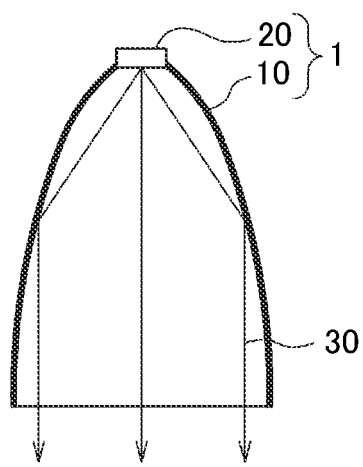
FIG. 8 is a cross sectional view of the light source unit along the optical axis according to the present invention.

FIG. 8 is a cross sectional view of the light source unit 1 corresponding to A-A line in FIG. 6. Most of the light, emitted from the LED 20 as a light source, except the light emitted in a direction aligned with the optical axis, reflects at the inner surface of the funnel shaped reflector 10, at least a part of which is parabolic, and goes out from the funnel shaped reflector 10 aligned with optical axis. Therefore, the light distribution angle, emitted from the light source unit 1 can be as small as 10 degrees or less.

Figure 9:
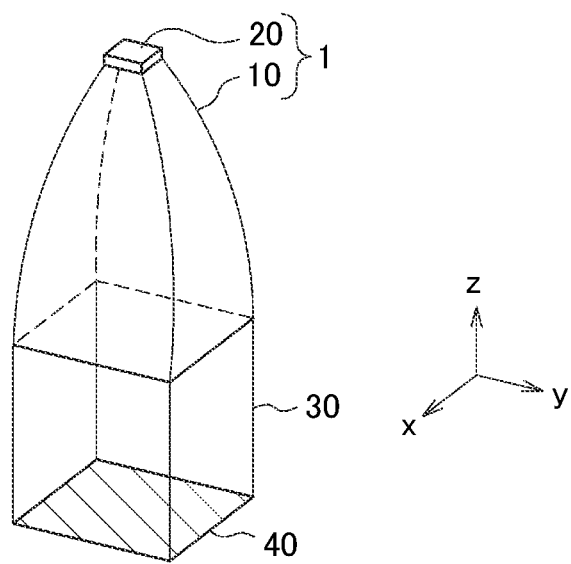
FIG. 9 is a perspective view to show a relation between the light spot and the light source unit according to the present invention.

An important point of the present invention is that a rectangular light spot can be acquired by rather a simple structure, in which the light source LED 20 is disposed at the neck of the funnel shaped reflector 10 having a rectangular emitting opening in a plan view. FIG. 9 is a perspective view to show the above explained structure. In FIG. 9, a shape of the light spot 40 emitted from the light source unit 1 is rectangular. In FIG. 9, the light spot is at rather near position to the light source unit 1; however, since the light from the light source unit 1 according to the present invention has a small light distribution angle of 10 degrees or less, light spot 40 maintains a rectangular spot shape even at a distant irradiated surface as 4 m remoted from the light source unit 1.

To maintain such light distribution, the relation between the dimension x1 or y1 of the opening and the height d1 of the funnel shaped reflector 10 is preferably, $d1 \geq 2x1$ and $d1 \geq 2y1$, more preferably, $d1 \geq 3x1$ and $d1 \geq 3y1$, and further preferably, $d1 \geq 4x1$ and $d1 \geq 4y1$. In the meantime, the height d1 can be referred to as a distance between the neck portion and opening portion along the optical axis of the funnel shaped reflector 10.

The relation between x1 or y1 and the height d1 is called as an aspect ratio. When the aspect ratio is made large, a height of the lighting device becomes large; however, since x1 and y1 are small as 6.5 mm, the height d1 is 20 mm or less when the aspect ratio is 3, the height d1 is approximately 26 mm when the aspect ratio is 4, thus, a thickness of the lighting device is in a range of no problem.

Figure 10:
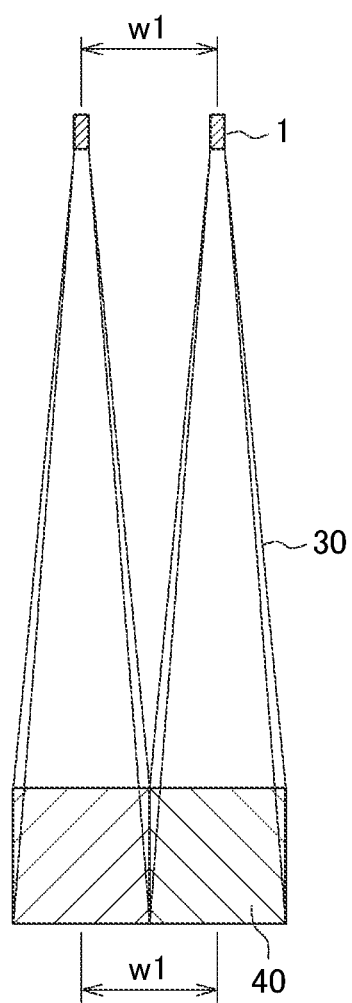
FIG. 10 is a cross sectional view of the structure of embodiment 1.

As described in FIG. 9, the light spot shape 40 can maintain a rectangular shape on an irradiated surface; therefore, any desired light spot shape 40 can be acquired by using a plurality of funnel shaped reflectors 10. FIG. 10 is a model which shows the above explained example. In FIG. 10, the two light source units 1 are located with a certain distance w1 to each other, the two light spots 40 are synthesized to form a laterally elongated rectangular light spot 40. The certain distance w1 can be determined by the light distribution angle of the emitting light from the light source unit 1 and a distance between the light source unit 1 and the irradiated surface. As shown in FIG. 10, the distance w1 between the two light source units 1 coincides with the distance w1 between centers of the two light spots 40.

In FIG. 10, a light source unit 1 has a funnel shaped reflector 10, as shown FIG. 9. A cross sectional view of the light flux 30 emitted from the light source unit 1 maintains rectangle as shown FIG. 9. Even the light flux 30 expands according to the light distribution angle, the light spot is still rectangle at the irradiated surface. In FIG. 10, the two light spots 40 are juxtaposed to form the laterally elongated rectangle light spot 40.

Figure 11:
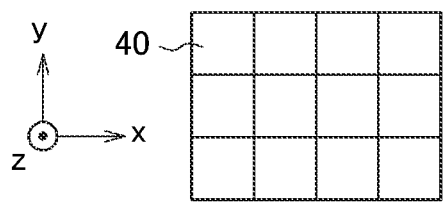
FIG. 11 is a first example of light spot according to embodiment 1.

In FIG. 10, the two light source units 1 are juxtaposed with a certain distance, however, the number of the light source units 1 is not limited to two, but any number of the light source units can be used to form a desired beam spot shape. FIG. 11 is an example of laterally elongated rectangular beam spot which is formed by arranging four light spots in lateral direction, and three light spots in longitudinal direction. In this case, the light source units are arranged in x direction and in y direction with certain distances: the certain distance in x direction is determined by the light distribution angle in x direction and a distance in z direction between the light source unit 1 and the irradiated surface; and the certain distance in y direction is determined by the light distribution angle in y direction and a distance in z direction between the light source unit 1 and the irradiated surface.

Figure 12:
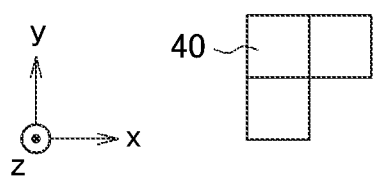
FIG. 12 is a second example of light spot according to embodiment 1.
Figure 13:
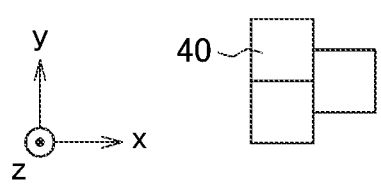
FIG. 13 is a third example of light spot according to embodiment 1.

FIG. 12 is an example in which the light spot is formed in L shape. FIG. 13 is an example in which the light spot is formed in horizontal T shape. Such irregular light spot can be easily realized by arranging the light source units 1 of the present invention with certain distances in x direction and in y direction.

The shape of the light spot 40 formed by the light source unit 1 according to the present invention is not limited to a square. An oblong bean spot can be formed by making the opening of the funnel shaped reflector 10 oblong, not square. In this case, too, the shape of oblong beam spot 40 is determined by a shape of the opening of the funnel shaped reflector 10 and a light distribution angle in x direction and a light distribution angle in y direction.

Figure 14:
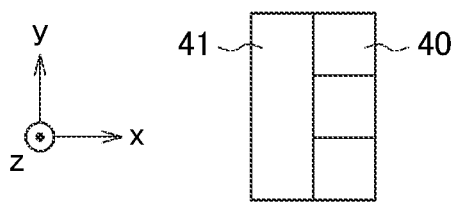
FIG. 14 is a fourth example of light spot according to embodiment 1.

FIG. 14 is an example of light spot 41, which is longitudinally elongated rectangle, and three square light spots 40 being juxtaposed in y direction to synthesize an oblong light spot. As described above, any desired shapes of light spot can be formed by arranging the oblong light spots 41 and the square light spots 40.

By the way, to maintain the shape of the light spot square as the opening of the light source unit 1, it is desirable to make parabolic at least a part of the cross sectional view of the funnel shaped reflector 10 along the optical axis, in addition to making the aspect ratio large.

Embodiment 2

Embodiment 1 explains a case of acquiring a rectangle light spot 40 on the irradiated surface by making the opening of the funnel shaped reflector 10 rectangle. In that case, it is necessary to make the light distribution angle emitted from the light source unit 1 small as 10 degrees or less. In the case of funnel shaped reflector 10 in FIG. 5, it is necessary to keep the ratio between x1 or y1 in the opening and a height d1 (it may be called as a depth d1 herein after) of the funnel shaped reflector 10, namely d1/x1 or d1/y1, to 2 or larger, preferably 3 or larger, and more preferably 4 or larger.

Figure 15:
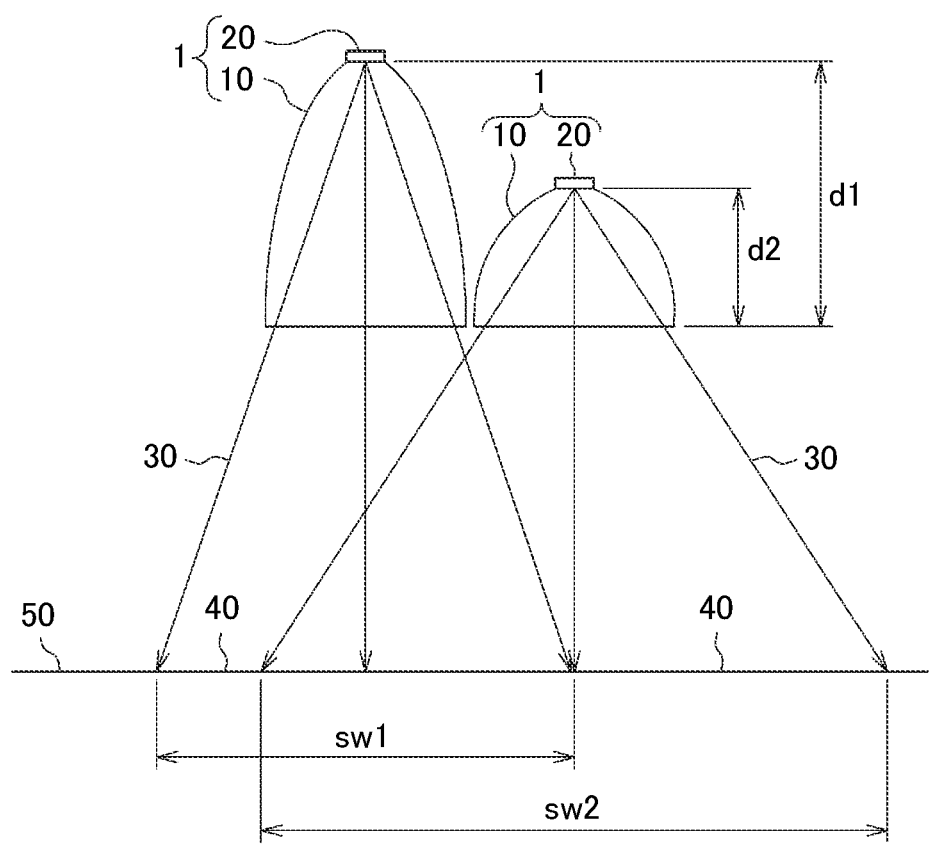
FIG. 15 is a cross sectional view which explains a structure of embodiment 2.

According to a ratio between a diameter of the opening (x1, y1, herein after, represented by x1) and the depth d1 of the funnel shaped reflector 10 becomes smaller, deviation from the rectangle in the light spot 40 becomes larger, and the light spot size becomes larger. FIG. 15 is a cross sectional view in which two light source units 1 are juxtaposed, in which the shapes of the openings of the two funnel shaped reflectors 10 are the same, but the depths of the two funnel shaped reflectors 10 are different. A dimension of each of the funnel shaped reflector 10 is approximately 6.5 mm, and the two funnel shaped reflectors 10 are located closely to each other.

In FIG. 15, a size of the light spot 40 formed by a light source unit 1, which is located at left hand side and has a larger depth d1, is sw1; a size of the light spot 40 formed by a light source unit 1, which is located at right hand side and has a shorter depth d2, is sw2; and sw2>sw1 at the irradiation surface 50, which is a certain distance apart from the light source unit 1. By the way, according to the depth (d1, de2) of the light source unit 1 becomes short, not only a diameter of the light spot 40 becomes large but also a shape of the light spot 40 deviates from rectangle.

In FIG. 15, since the two light source units 1 are closely located, the light fluxes 30 from the two light source units 1 are mixed together at the irradiated surface 50. When a distance between the light source unit 1 and the irradiated surface 50 becomes larger than a certain value, the light spots are completely mixed together and becomes as one light spot.

Figure 16:
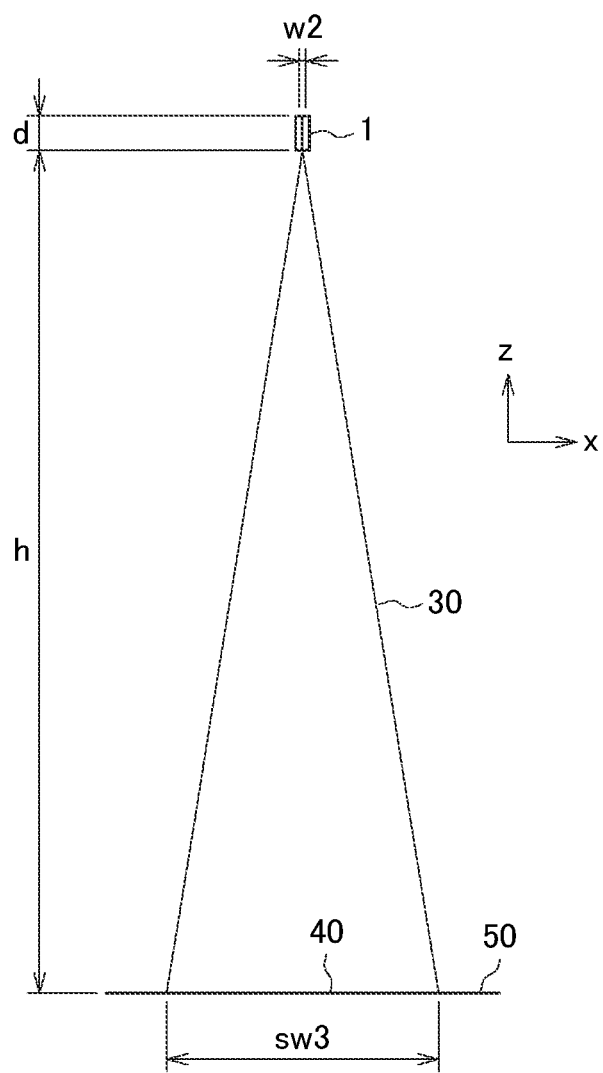
FIG. 16 is another cross sectional view which explains a structure of embodiment 2.

FIG. 16 is a cross sectional view of the lighting system which explains the embodiment when dimensions of light source unit 1, the irradiated surface 50 and so forth are more resembled to the actual system. In FIG. 16, two light source units 1 are juxtaposed with a distance between the centers is w2, namely, e.g. 7 mm. A depth d of the light source unit 1 is e.g. 20 mm. The diameter of the light spot 40 at the irradiating surface 50, which is apart from the two light source units 1 in a distance h (e.g. 4 mm), is sw3.

The light spot 40 projected on the irradiating surface 50 is actually a light projected from two light source units 1. However, a distance between the two light source units 1 is 7 mm and a distance h between the light source units 1 and the irradiated surface 50 is 4 m, thus, the light from the two light source units is completely mixed and becomes as one light spot.

In addition, the distance w2 between the light source units 1 is much smaller compared with a distance h between light source unit 1 and the floor 50, therefore, the center of the light spot 40 on the floor 50 is actually not changed. FIG. 16 is an example in which two light source units 1 are used, however, the principle is almost the same when three light source units 1 are used or when four light source units 1 are used.

Figure 17:
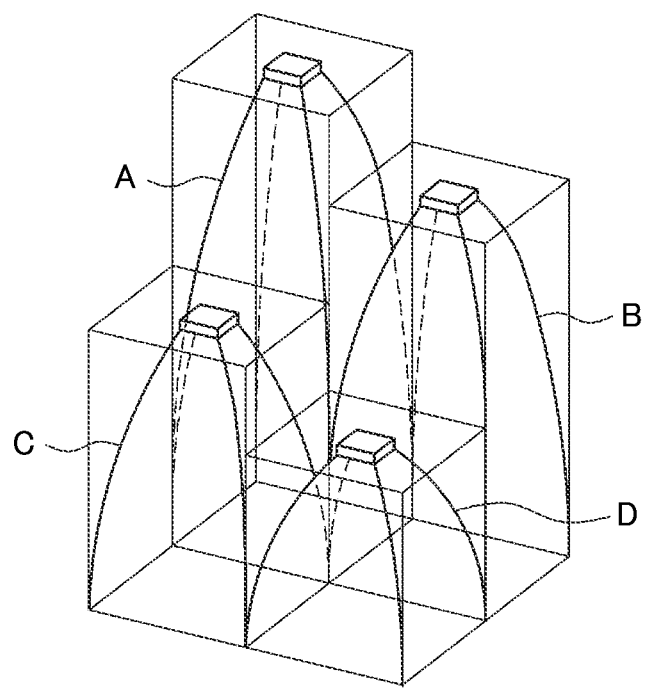
FIG. 17 is a perspective view which shows a structure of embodiment 2.

FIG. 17 is a perspective view of the lighting device in which four light source units, each of which has a different aspect ratio, are disposed. In FIG. 17, the four light source units A, B, C, and D, each having a square opening are arranged to form a square outer shape in total in a plan view. Each of the openings of the light source units A, B, C and D has a square opening of the same diameter, however, heights (depths) are different in each of the light source units 1. The aspect ratio of the light source unit A is the largest and the aspect ratio of the light source unit D is the smallest. Therefore, the light spot 40 formed by the light source unit A keeps a rectangle, however, the light spot 40 formed by the light source unit D deviates most from a rectangle. By the way, the cuboids corresponding to the light source units A, B, C, and D are virtual spaces in which each of the light source units are located.

By the way, a center of the light spot 40 is almost not changed even when each of the four light source units are separately lighted on as explained in FIG. 16. Therefore, a shape of the light spot 40 can be changed by choosing one of the four light source units 1 in the lighting device according to the present invention.

Figure 18:
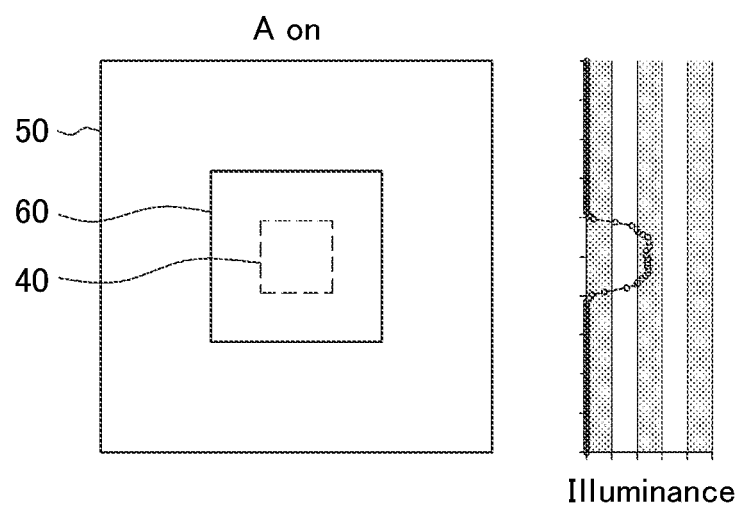
FIG. 18 is an example of light spot according to a light source unit A.

FIG. 18 is a shape of the light spot which is formed when only the light source unit A of FIG. 17 is lighted on. FIG. 18 is a case when a light spot 40 illuminates an irradiated region 60 of the floor 50, which is the same in the following figures. In FIG. 18, the light spot 40 illuminating the irradiated surface 60 maintains rectangle. That is to say, since the aspect ratio of the light source unit A is large, the light flux maintains the shape of opening of the light source unit A, namely rectangle.

The graph of right hand side of FIG. 18 is an illuminance distribution corresponding to the light spot 40. The abscissa of the graph of FIG. 18 is illuminance. The illuminance distribution shows a steep rise at the light spot portion, thus a clear rectangular light spot 40 can be acquired.

Figure 19:
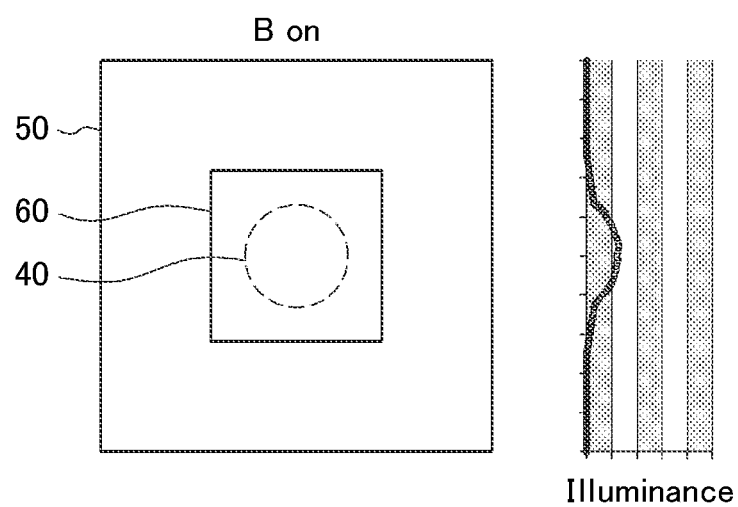
FIG. 19 is an example of light spot according to a light source unit B.

FIG. 19 is a shape of the light spot which is formed when only the light source unit B of FIG. 17 is lighted on. Since the aspect ratio of the light source unit B is smaller than that of the light source unit A, the light spot 40 in the irradiated region 60 deviates from rectangle, and becomes similar to circle. The graph of the right hand side of FIG. 19 is an illuminance distribution corresponding to the light spot 40. The illuminance distribution of FIG. 19 shows a gradual rise at the light spot 40 compared with that of FIG. 18, and a peak of the illumination is less than that of FIG. 18.

Figure 20:
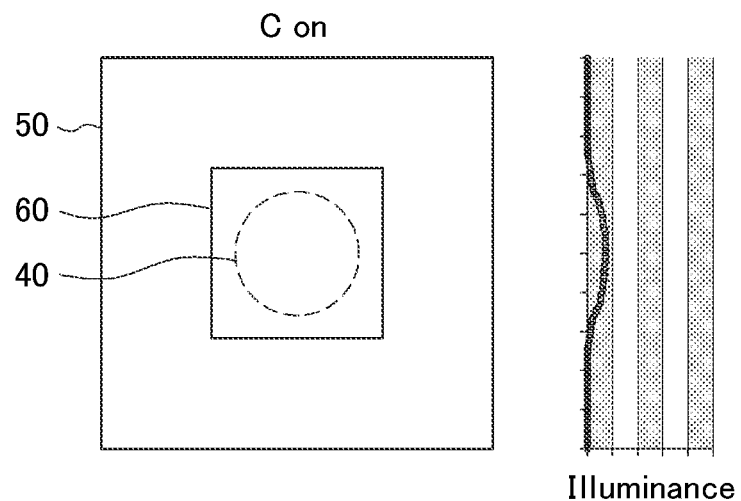
FIG. 20 is an example of light spot according to a light source unit C.

FIG. 20 is a shape of the light spot which is formed when only the light source unit C of FIG. 17 is lighted on. Since the aspect ratio of the light source unit C is further smaller than that of the light source unit B, the light spot 40 in the irradiated region 60 further deviates from rectangle, and becomes similar to circle and the diameter of the circle is even larger. The graph of the right hand side of FIG. 20 is an illuminance distribution corresponding to the light spot 40. The illuminance distribution of FIG. 20 shows a further gradual rise at the light spot 40 compared with that of FIG. 19, and a peak of the illumination is less than that of FIG. 19.

Figure 21:
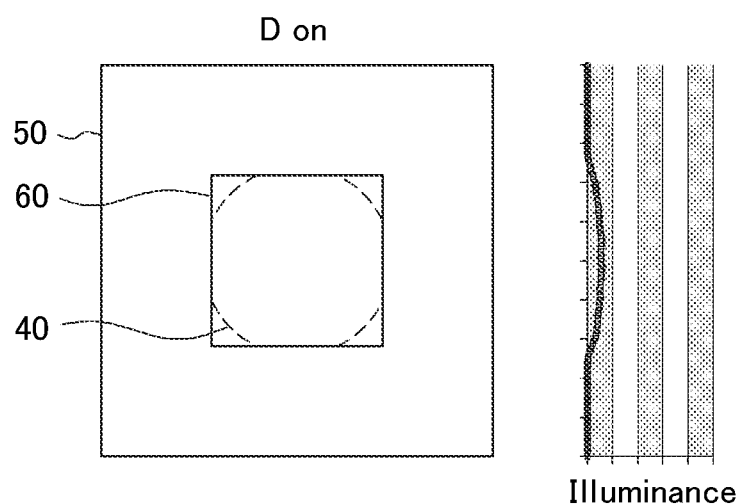
FIG. 21 is an example of light spot according to a light source unit D.

FIG. 21 is a shape of the light spot which is formed when only the light source unit D of FIG. 17 is lighted on. Since the aspect ratio of the light source unit D is further smaller than that of the light source unit C, the light spot 40 on the irradiated region 60 further deviates from rectangle, and becomes more similar to circle and the diameter of the circle is even larger. The graph of the right hand side of FIG. 21 is an illuminance distribution corresponding to the light spot 40. The illuminance distribution of FIG. 21 shows a further gradual rise at the light spot 40 compared with that of FIG. 20, and a peak of the illumination is less than that of FIG. 20.

As described above, the lighting device of FIG. 17 can project a specific illuminance distribution by choosing one of four light source units, A, B, C and D.

Figure 22:
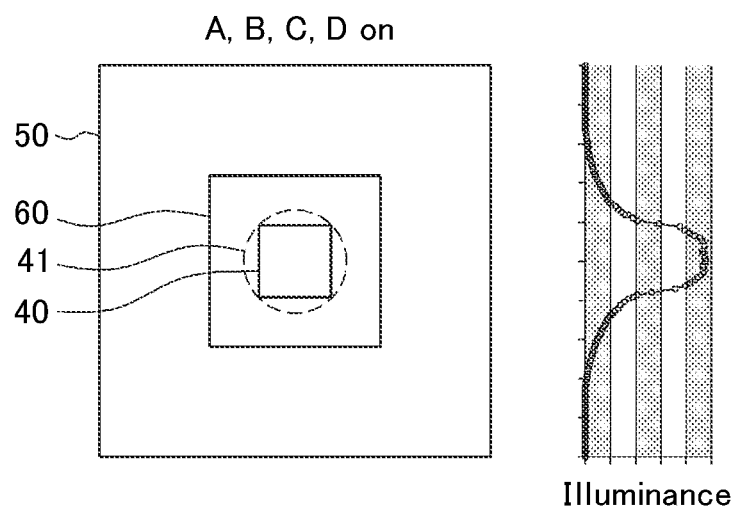

The lighting device according to FIG. 17 can form further different shapes of light spot by combining four light source units. FIG. 22 is an example in which all the four light source units, A, B, C and D in the lighting device of FIG. 17 are lighted on. In FIG. 22, the contour of the solid line shows a region of the highest illumination region, and the contour of the broken line shows a region of the second highest illumination region. Other contours are omitted. It is the same in FIGS. 23 and 24.

The graph of right hand side of FIG. 22 is an illuminance distribution corresponding to the light spot 40; the abscissa of the graph of FIG. 22 is illuminance. The illuminance is larger than that of FIG. 18 because all the light source units 1 are lighted on in FIG. 22. On the other hand, a rise in illumination is more gradual than that of FIG. 18.

Figure 23:
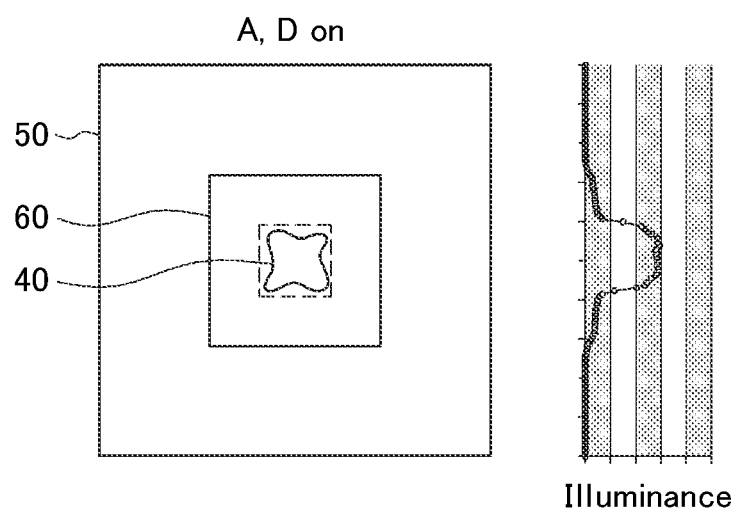

FIG. 23 is an example in which only the light source units A and D in the lighting device of FIG. 17 are lighted on. The shape of the light spot maintains comparatively rectangle shape by influence of the light source unit A. The graph of right hand side of FIG. 23 is an illuminance distribution corresponding to the light spot 40 of the left hand side; the abscissa of the graph of FIG. 23 is illuminance. In FIG. 23, the illuminance distribution of FIG. 21 is superposed by the illuminance distribution of FIG. 18, therefore, a rise of illumination at the light spot is steeper than that of FIG. 21.

Figure 24:
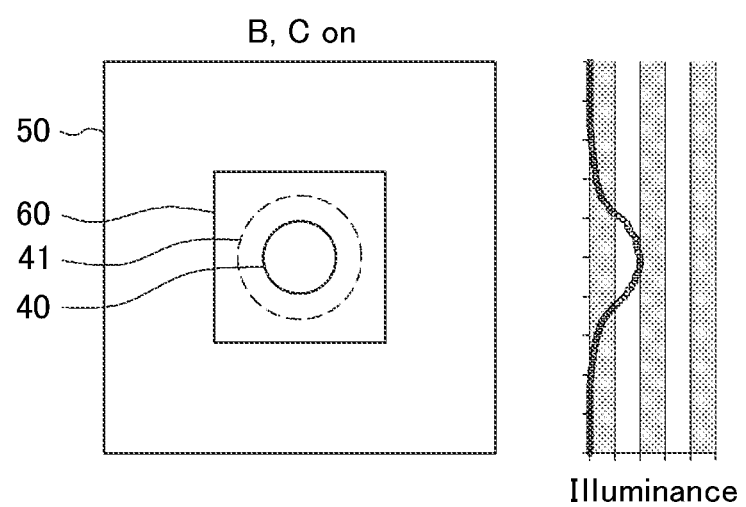

FIG. 24 is an example in which only the light source units B and D in the lighting device of FIG. 17 are lighted on. Since both the shape of the light spot of the light source unit B and the shape of the light spot of the light source unit D deviate from rectangle, the light spot of FIG. 24 also deviates from rectangle.

The graph of right hand side of FIG. 24 is an illuminance distribution corresponding to the light spot 40 of the left hand side; the abscissa of the graph of FIG. 24 is illuminance. In FIG. 24, the illuminance distribution of FIG. 19 is superposed by the illuminance distribution of FIG. 20, therefore, a rise of illumination at the light spot 40 is more gradual than that of FIGS. 22 and 23.

As described above, light spots of various shapes or various distributions can be realized by using four different light source units according to embodiment 2.

Embodiment 3

Figure 25:
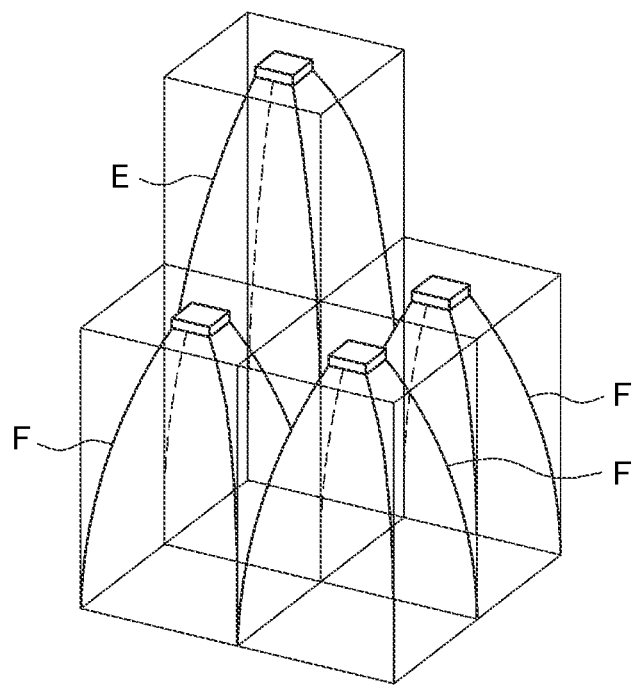
FIG. 25 is a perspective view which shows a structure of embodiment 3.

Embodiment 3 relates a different combination of the light source units 1. FIG. 25 is a perspective view of the lighting device in which four light source units, which has a different aspect ratio, are disposed. FIG. 25 differs from FIG. 17 in that FIG. 25 uses light source unit E, which has a large aspect ratio, and three light source units F, which has a small aspect ratio. In the meantime, the rectangles corresponding to the light source unit E and the three the light source units F indicate spaces in which each of those light source units is located.

Figure 26:
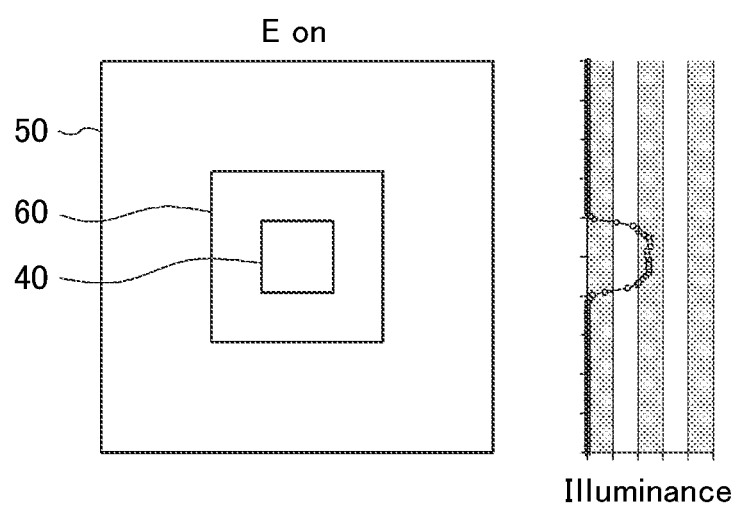
FIG. 26 is an example of light spot according to a light source unit E.

FIG. 26 is a shape of the light spot which is formed when only the light source unit E of FIG. 25 is lighted on. Since the aspect ratio of the light source unit E is large, the shape of the light spot of FIG. 26 is similar to the shape of the light spot of FIG. 18. The graph of right hand side of FIG. 26 is an illuminance distribution corresponding to the light spot 40 of left hand side. The illuminance distribution of FIG. 26 is also similar to the illuminance distribution of FIG. 18.

Figure 27:
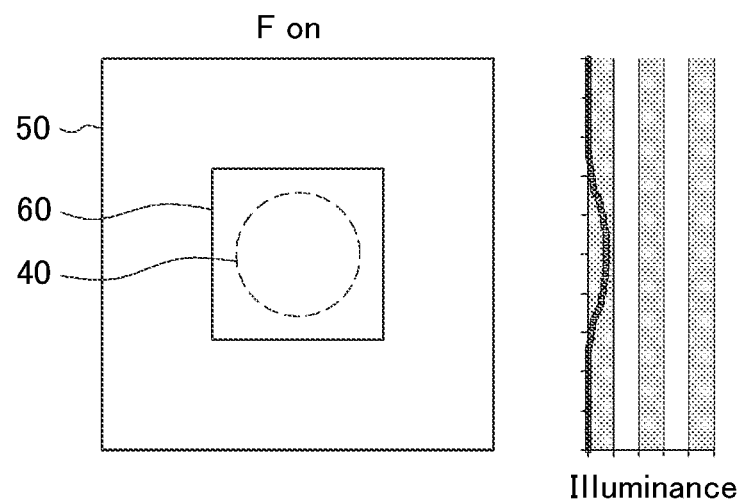
FIG. 27 is an example of light spot according to a light source unit F.

FIG. 27 is a shape of the light spot which is formed when only one light source unit F of FIG. 25 is lighted on. The aspect ratio of the light source unit F is smaller than the aspect ratio of the light source unit E. The light spot shape of FIG. 27 is almost the same as the shape of the light spot of FIG. 20. By the way, the shape of the light spot in FIG. 27 is shown by broken line, while the shape of the light spot in FIG. 26 is shown by slid line. The reason is that the contour of illumination of FIG. 27 is rather ambiguous compared with the contour of illumination of FIG. 26 because the light from the light source unit F diverges more than that of the light source unit E. The graph of right hand side of FIG. 27 is an illuminance distribution corresponding to the light spot 40 of left hand side. The illuminance distribution of FIG. 27 is also similar to the illuminance distribution of FIG. 20.

Figure 28:
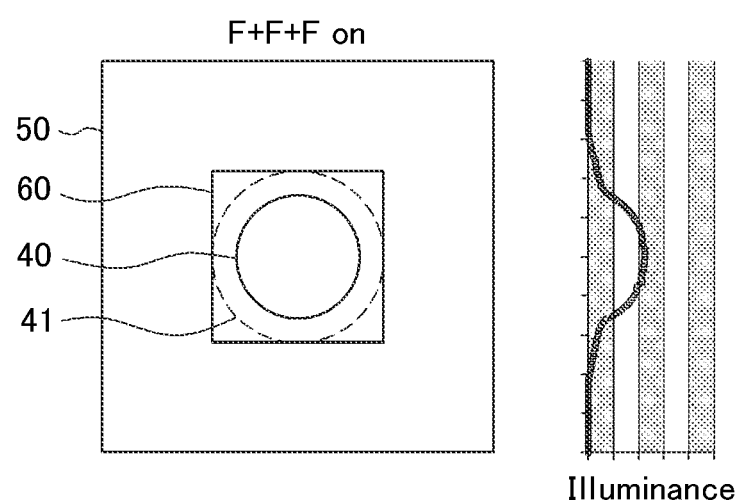

FIG. 28 is a shape of the light spot which is formed when all the three light source units F of FIG. 25 are lighted on. In the light spot of FIG. 28, the solid line 28 of inside is a contour of large illumination and the broken line of outside is a contour of small illumination. Since the illumination intensity of FIG. 28 is three times larger than that of FIG. 27, the contour of the light spot 40 also becomes different.

The graph of right hand side of FIG. 28 is an illuminance distribution corresponding to the light spot 40 of the left hand side. Since the illumination intensity of FIG. 28 is three times larger than that of FIG. 27, the change in the illumination in FIG. 28 is steeper than that of FIG. 27.

Comparing FIGS. 28 and 26, the illuminances at the centers of the light spots are approximately the same; however, the shapes of light spots are greatly different between FIGS. 28 and 26. As explained in this example, according to embodiment 3, the shape of the light spot 40 can be greatly changed while the peak of the light spot 40 is not changed.

As described above, the rectangular light spot 40 can be formed by making a shape of the opening of the funnel shaped reflector 10 of the light source unit 1 rectangular. In addition, various shapes of light spots 40 can be acquired by changing aspect ratio of the funnel shaped reflector 10. Further, various shapes of the light spots 40 and various illuminance distributions of the light spots 40 can be realized by combination of funnel shaped reflectors 10 of various aspect ratios.

In the meantime, in embodiments 2 and 3, the aspect ratios of adjacent plural light source units are different; however, if necessary, the aspect ratios of adjacent plural light source units can be the same. According to this structure, the intensity of the illuminance can be made larger while the shape of the light spot is kept the same. For example, in FIG. 10, each of the two light spots 40 is formed by only one light source unit 1; however, if a plurality of light source units 1 are located adjacently for each of the light spots, a rectangle light spot of high illuminance can be realized.

Since each of the light source units 1 of the present invention is small, a thickness of the lighting device does not become much thicker even the aspect ratio of the funnel shaped reflector 10 is made larger. If an illuminance intensity of each of the light spots is intended to be made larger, a plurality of the light source units can be juxtaposed.

What is claimed is:

1. A lighting device comprising a structure having a plurality of light source units adjacently disposed,
wherein the plurality of light source units include a first light source unit and a second light source unit,
the first light source unit includes a first funnel shaped reflector having a first opening and a first neck, and a first LED, which is disposed at the first neck,
the second light source unit includes a second funnel shaped reflector having a second opening and a second neck, and a second LED, which is disposed at the second neck,
a plan view of the first opening and the second opening are a rectangle, and
provided a distance from the neck to the opening along an optical axis is d, and one side of the rectangle is x,
the first light source unit and the second light source unit satisfies d/x is 2 or larger, and
a first distance from the first neck to the first opening along the optical axis is greater than a second distance from the second neck to the second opening along the optical axis.

2. The lighting device according to claim 1,
wherein either one of the first light source unit and the second light source unit satisfies, d/x is 3 or larger.

3. The lighting device according to claim 1,
wherein d/x of the first light source unit and d/x of the second light source unit are different.

4. The lighting device according to claim 1,
wherein the number of the plurality in claim 1 is 4 or more.

5. The lighting device according to claim 1,
wherein the rectangle is a square.

6. The lighting device according to claim 1,
wherein the rectangle is an oblong, and
the x is a long side of the oblong.

* * * * *